Patented May 27, 1941

2,243,644

UNITED STATES PATENT OFFICE 2,243,644

PLASTICIZED PROTEIN COMPOSITION

Robert J. Myers, Elkins Park, Pa., assignor to The Resinous Products & Chemical Company, Philadelphia, Pa.

No Drawing. Application March 12, 1940, Serial No. 323,629

8 Claims. (Cl. 106—38)

This invention relates to protein plastics and comprises compositions containing as essential ingredients a protein, particularly casein, and a salt of a hydrocarbon-substituted aryloxy aliphatic carboxylic acid.

It has heretofore been proposed to add glycols or glycerin to proteins to maintain their softness. These agents, however, do not impart the flexibility and elasticity required. They frequently cause difficulties when it is attempted to blend in other materials. Furthermore, since they depend almost entirely for their effectiveness on their affinity for moisture, proteins softened with them usually have poor water-resistance.

One purpose of this invention is to provide compositions based on a protein, which may be formed into strong and flexible sheets, films, coatings, and other articles. It is also an aim to increase the water-resistance of protein films.

It has been found that articles composed primarily of casein and similar proteins can be rendered more flexible and elastic by the addition of salts of hydrocarbon-substituted aryloxy-aliphatic carboxylic acids to the protein preparation used for forming the articles. The salt may be dispersed in a solution of casein or other protein, which is then formed into films, coatings, or other articles. It may also be mixed with powdered protein preparations before molding or extruding therewith.

The salts which have been found effective are obtainable from an acid of the general formula R—O—$C_nH_{2n}$—COOH wherein $n$ represents a whole number less than six, and R represents an aryl nucleus, hydrocarbon-substituted with at least four carbon atoms. The group represented by —$C_nH_{2n}$— in the above formula is preferably such a group as —$CH_2$— or —$CH_2.CH_2$— or a branched group such as —$CH_2CH(CH_3)$—. The hydrocarbon-substitutents in the aryl group must possess a total of at least four carbon atoms, three of which must occur in the same substituent group. Typical acids are octyl phenoxyacetic acid, sec-amylnaphthyloxyacetic acid, cyclohexyl-phenyloxyisobutyric acid, or isopropylcresyloxypropionic acid. Other useful substituents in the aryl group include naphthenyl, phenyl, hexyl, bornyl, undecenyl, dodecyl, benzyl, oleyl, $\alpha,\alpha,\gamma,\gamma$-tetramethylbutyl, etc. These acids vary from oils to waxy solids. They form salts with ammonia, amines, and metals. The polyvalent metal salts are of particular value as they are generally insoluble in water and increase the water-resistance of proteins compounded with them. Typical of these salts are the magnesium, calcium, barium, aluminum, zinc, zirconium, lead, cobalt, manganese, iron, tin, uranium, etc. derivatives. A salt of an aryloxy aliphatic acid may constitute about 20% to about 90% of the plasticized article.

The proteins which are useful in this invention include gelatin, glue, casein, soya bean protein, zein, etc. They are the proteins which may be formed and shaped into useful articles and are, therefore, here termed protein plastics. These materials may be used in a crude or a purified form. They may also be used in mixtures which include compatible resins, such as urea-formaldehyde condensates, alkyd-type resins, oil-modified alkyd-type resins, etc.

In conjunction with the protein or protein and resin there may be used waxes, such as carnauba wax, pigments, such as titanium oxide, dyes, etc. When desired, a small amount of a hardening agent, such as an aldehyde like formaldehyde, a polymer of an aldehyde, or an addition product thereof, may also be used. To assist in dispersing and blending the materials together there may be used a salt of an oxygen-containing amine and a fatty acid, such as triethanolamine oleate.

The articles formed from the mixture of protein and aryl ether salt or protein, resin, and aryl ether salt with or without other modifying agents vary from opaque to transparent. With proper choice of protein and an aryl ether salt, clear, flexible pellicles can be formed. The products contemplated in this invention are useful for coatings, wrappings, molded or cast articles such as buttons, buckles, ornaments, costume jewelry, etc.

The following examples are given to illustrate this invention.

Example 1

A casein glue was prepared from 10 parts of dry, powdered casein, 5 parts of concentrated ammonia, and 60 parts of water. Ten parts of zinc dodecyl phenoxyacetate were then dissolved in ten parts of toluene and stirred into the casein glue. The dispersion was then thinned with a small amount of water and made into a film on a glass plate. When the film had dried, it was removed from the glass plate and found to be clear and flexible.

In a similar way films were made with aluminum dodecyl phenoxyacetate and zinc capryl phenoxyacetate in place of the zinc dodecyl phenoxyacetate used above. Films of excellent flexibility were obtained in all cases.

Example 2

A casein glue was prepared as in Example 1, and thereto was added five parts of an alkyd-type resin prepared from castor oil, phthalic anhydride and glycerol together with five parts of aluminum capryl phenoxyacetate. Clear films were obtained from this preparation in a highly plasticized state.

Example 3

To the casein glue of Example 1 there were added 45 parts of zinc dodecyl phenoxyacetate. The mixture was diluted with a little water and formed into films which when dry were highly flexible, clear, and waxy, but somewhat tacky under pressure.

When the casein glue of Example 1 was treated with 25 parts of zinc dodecyl phenoxyacetate, the resulting films were free from tackiness and were soft, transparent, and flexible.

Example 4

Five parts of casein were wet with three parts of concentrated ammonium hydroxide solution and taken up with 27 parts of water. Three parts of a 3% solution of formaldehyde were then stirred into the glue. Shortly thereafter ten parts of aluminum iso-octylphenoxyacetate were stirred in, followed by the addition of one-half part of carnauba wax dispersed in a small amount of water with one-half part of morpholine oleate. The viscosity of the mixture was further adjusted with water and ten parts of titanium oxide and China clay added. The final preparation was used for the coating of paper.

I claim:

1. A composition of matter comprising a protein plastic and a salt of an acid of the formula $R-O-C_nH_{2n}-COOH$ wherein $n$ represents a whole number less than six and R represents an aryl nucleus substituted with at least four carbon atoms of which at least three occur in the same substituent group.

2. A composition of matter comprising casein and a polyvalent metal salt of an acid having the formula $R-O-CH_2-COOH$ wherein R is an aryl nucleus substituted with at least four carbon atoms of which at least three occur in the same substituent group.

3. A composition of matter comprising casein and an aluminum salt of an acid having the formula $R-O-CH_2-COOH$ wherein R is an aryl nucleus substituted with at least four carbon atoms of which at least three occur in the same substituent group.

4. A composition of matter comprising casein and aluminum caprylphenoxyacetate.

5. A film comprising casein and a polyvalent metal salt of an acid of the formula $$R-O-C_nH_{2n}-COOH$$

wherein $n$ represents a whole number less than six and R represents an aryl nucleus substituted with at least four carbon atoms of which at least three occur in the same substituent group.

6. A film comprising casein in admixture with a polyvalent metal salt of an alkylphenoxyacetic acid.

7. A film comprising casein in admixture with zinc dodecylphenoxyacetate.

8. The process of plasticizing protein plastics which comprises mixing 1 to 4 parts of a protein plastic with 4.5 to 1 parts of a salt of an acid of the formula $R-O-C_nH_{2n}-COOH$ wherein $n$ represents a whole number less than six and R represents an aryl nucleus substituted with at least four carbon atoms of which at least three occur in the same substituent group.

ROBERT J. MYERS.